United States Patent [19]

Bell, Jr. et al.

[11] 4,292,490

[45] Sep. 29, 1981

[54] ELECTRICAL DISCHARGE MACHINING POWER SUPPLY WITH DIGITALLY CONTROLLED ON AND OFF TIME AND PROTECTIVE SYSTEM

[75] Inventors: Oliver A. Bell, Jr., Statesville; Randall C. Gilleland, Troutman; Davey J. Chance, Concord, all of N.C.

[73] Assignee: Colt Industries Operating Corp., New York, N.Y.

[21] Appl. No.: 36,570

[22] Filed: May 7, 1979

Related U.S. Application Data

[63] Continuation of Ser. No. 794,440, May 6, 1977, abandoned.

[51] Int. Cl.³ .................................................. B23P 1/02
[52] U.S. Cl. ................................... 219/69 P; 219/69 C
[58] Field of Search ................. 219/69 P, 69 C, 69 M

[56] References Cited

U.S. PATENT DOCUMENTS

| | | | |
|---|---|---|---|
| 3,697,879 | 10/1972 | Holliday | 219/69 C |
| 3,805,012 | 4/1974 | Bell, Jr. et al. | 219/69 C |
| 3,809,848 | 5/1974 | Bell, Jr. | 219/69 P |
| 4,078,163 | 3/1978 | Bell, Jr. et al. | 219/69 C |

Primary Examiner—C. C. Shaw
Attorney, Agent, or Firm—Harry R. Dumont

[57] ABSTRACT

A digitally controlled and free-running multivibrator for the power supply is used to supply machining power pulses of predetermined ON and OFF time duration. The pulse output from the digital multivibrator is passed through at least one intermediate drive stage to trigger an electronic output switch, which is operatively connected both to a main DC power source and the gap, to actually provide the machining power pulses thereto. Responsive to a predetermined drop in gap voltage, a digitally predetermined extended OFF time is added.

10 Claims, 1 Drawing Figure

ELECTRICAL DISCHARGE MACHINING POWER SUPPLY WITH DIGITALLY CONTROLLED ON AND OFF TIME AND PROTECTIVE SYSTEM

REFERENCE TO RELATED APPLICATION

This application is a continuation of co-pending U.S. Patent Appln. Ser. No. 794,440 filed on behalf of Oliver A Bell, Jr., Randall C. Gilleland and Davey J. Chance on May 6, 1977 for "Electrical Discharge Machining Power Supply With Digitally Controlled ON and OFF Time and Protective System", now abandoned.

BACKGROUND OF THE INVENTION

The field to which the present invention relates is that generally known as electrical discharge machining, sometimes hereinafter referred to as EDM, in which material is removed from an electrically conductive workpiece by the action of precisely controlled electrical gap discharges occurring between a tool electrode and the workpiece. A dielectric coolant fluid is circulated and recirculated through the gap, usually under pressure, throughout the machining operation. An electrode or a workpiece servo feed system is used to provide relative movement and thus maintain an optimum gap spacing between the electrode and workpiece as the workpiece material is being removed. It is important to the process of electrical discharge machining that the machining power pulses provided to the gap be of closely and precisely controllable ON-OFF time and frequency to insure repeatability of results and to provide appropriate cutting action for the particular type of operation being carried on. For example, with a roughing type machining operation, relatively low frequency, high current magnitude pulses would be used for cutting. For a finishing type machining operation, relatively high frequency, lower current magnitude pulses would be employed. Various types of pulse generators which have this capability and adjustability have been developed and are in current commercial use for electrical discharge machining. One commonly used type of electrical discharge machining power supply includes as a principal part of its machining power pulse generator an astable multivibrator in which ON-OFF time and frequencies are controlled and preset by a ganged capacitor and resistor arrangement. One example of this type of pulse generator is shown and described in Sennowitz, U.S. Pat. No. 3,649,802, issued on Dec. 28, 1970 for "Protective System For Electrical Discharge Machining Power Supply Circuit", which patent is of common ownership herewith. Other types of pulse generators are in use which include various arrangements and combinations of astable multivibrators, oscillators and the like, to provide for precise control of the machining power pulse duration and frequency. Bell, U.S. Pat. No. 3,809,847, issued on May 7, 1974 for "Method and Apparatus for Electrical Discharge Machining", discloses one example of a digital type multivibrator used to provide EDM. An additional protective system for a digital EDM power supply is disclosed in Bell, U.S. Pat. No. 3,805,012, issued on Apr. 16, 1974 for "Electrical Discharge Machining Power Supply With Protective System For Output Switch Failure".

SUMMARY OF THE INVENTION

The present invention will thus be seen to provide an EDM pulse generator, particularly adaptable for controlling in a precisely accurate manner the operation of one electronic switch or a bank of electronic switches, which have their power conducting electrodes connected between a DC power supply and the machining gap for providing the machining power pulses.

The present invention, while it discloses as a preferred embodiment an EDM circuit including transistors employed as the electronic switches, is not limited to the use of this particular type of switch. By making substitutions and minor revisions to the circuits, it will be possible for one skilled in the electronic art to substitute other electronic switches for the transistors. By "electronic switch", I mean any electronic control device having two or more electrodes comprising at least two principal or power conducting electrodes effective to control current flow in the power circuit, the conductivity between the principal electrodes being controlled by a control electrode within the switch or by interruption or change of polarity of voltage applied to one of the principal electrodes, whereby the conductivity of the power circuit is controlled statically or electrically without movement of any actual mechanical element within the switch. Included in this definition, by way of example but not limitation, are electronic tubes, transistors, silicon controlled rectifiers and similar semiconductor devices.

The protective system according to the present invention is related to gap short circuit protection in such manner that during the short circuit the OFF time will be extended.

The electronic output switch in the circuit of the present invention is controlled in this operation by a free-running digital type multivibrator including a combination of transistor-transistor logic (TTL) type integrated circuits of medium scale integration and complexity, such as, for example, the several types hereinafter referred to which are now made and sold by the National Semiconductor Corp. of Santa Clara, California. The use of such circuits in the present invention serves to reduce overall cost and add to the reliability and operation of the power supply circuit.

BRIEF DESCRIPTION OF THE DRAWINGS

The present invention, which will be fully described in the appended specification, is illustrated by the accompanying drawing, which drawing is a combined schematic and partial block diagrammatic showing of the preferred embodiment of the invention.

DESCRIPTION OF THE PREFERRED EMBODIMENT

Figure 1:
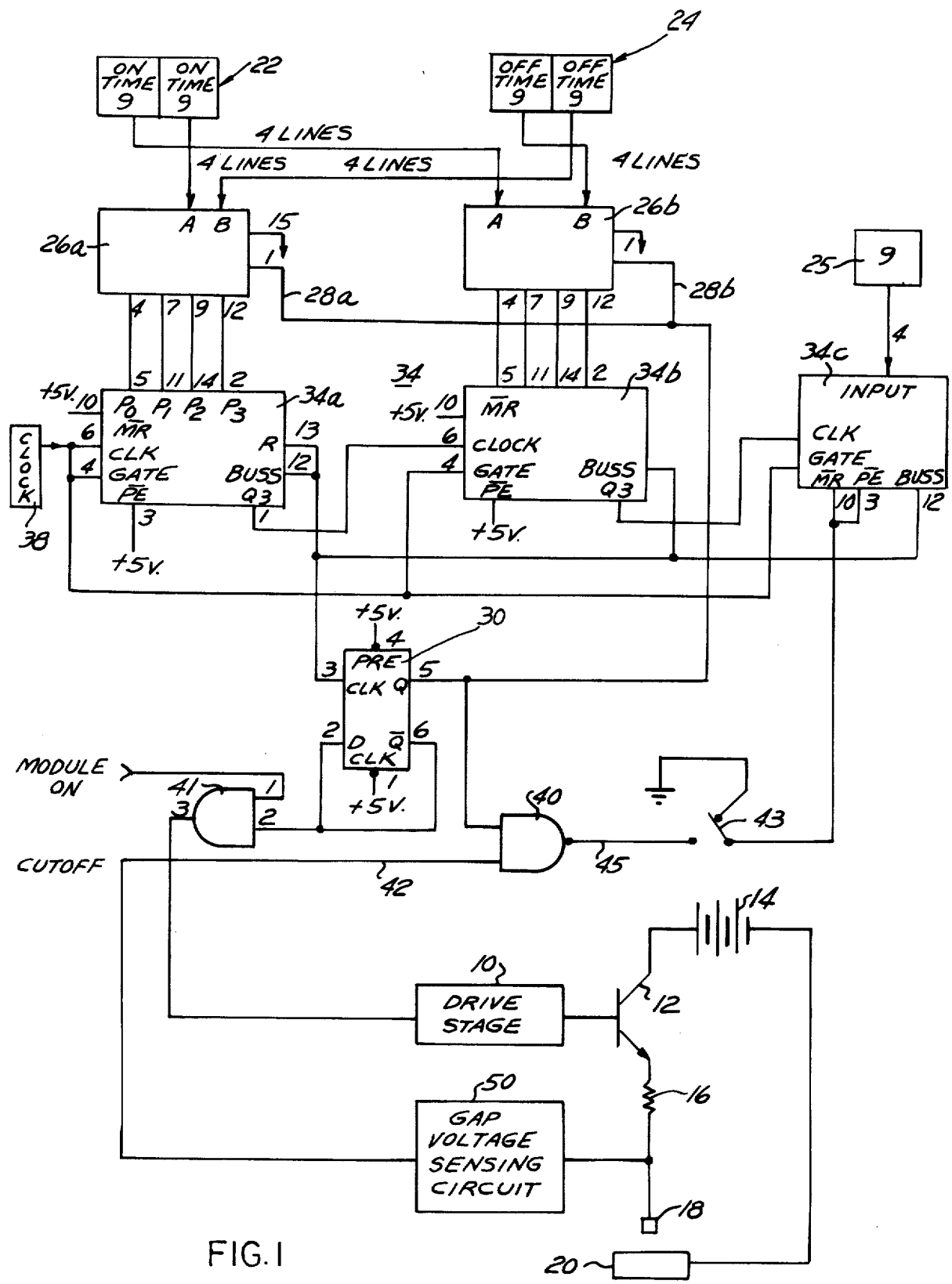

The drawing shows the individual parts of the EDM pulse generator in block diagrammatic form as they are used to provide a triggering output pulse train to a drive stage 10, one or more of which stages may be used as required to provide pulse shaping and amplification to the multivibrator output pulses. The amplified triggering pulses are then applied to the base of one or more output transistor switches 12 as shown at the lower right hand corner of the drawing. The output switch 12 is incorporated as an NPN transistor having its collector connected to the positive terminal of the main DC power supply 14 and its emitter connected through a series current limiting resistor 16 to the gap at the tool electrode 18. The negative terminal of the DC power source 14 is connected to the workpiece 20. The polarity illustrated in the drawing is that known as "reverse polarity", which form of polarity is commonly used with graphite type electrodes and with certain workpiece materials. It will be understood that the opposite polarity, commonly known as "standard polarity" with the electrode negative and workpiece positive, is used for other desired combinations of tool electrode and workpiece.

In any case, the reversal of polarity and the incorporation of a PNP transistor in place of the NPN output transistor switch 12 in the circuit would be readily apparent and easily achieved by one skilled in the electronic arts.

Included in the digital multivibrator circuit at the top of the drawing are the ON-time switch 22 and the OFF-time switch 24, which include units and tens setting in each, and are preset in accordance with the ON-time and OFF-time required. In the present instance, the settings are in 1 to 99 microseconds. The switches 22 and 24 are preferably binary coded decimal thumbwheel switches which provide a visual read-out display for the operator, enabling him to be informed of the settings at which the machining is being carried out. Also included in the digital multivibrator is an intermediate quadruple, two-input data selector stage 26a, 26b as shown. The data selector stage in each case is capable of accepting the two separate four-bit binary coded decimal input data as preset by the ON-time switch 22 and the OFF-time switch 24. One type of quadruple, two-input data selector which may be used in connection with the present invention is that known as Model N74157, which is manufactured and sold commercially by the National Semiconductor Corporation of Santa Clara, California.

There is thus provided a single data select input through leads 28a and 28b which selects either the ON-time switch preset data on switch 22 or the OFF-time preset data on switch 24.

The next following stage from the data selector stage 26a is a decimal counter stage including the units and tens sections identified respectively by the numerals 34a and 34b. A further cut-off decimal counter stage 34c is connected in circuit in a manner and for a purpose to be explained hereinafter. According to the ON or OFF-time switch setting selected through the data selector stages 26a and 26b there will be provided an appropriate output from the following counter stages 34a and 34b. The binary coded decimal counters used may be, for example, of the type MC4016 manufactured and currently available from the Motorola Semiconductor Products, Inc. of Phoenix, Arizona. The counters in the drawing are shown connected to provide the two digits as preset on the switches 22 and 24. Cut-off control is exercised by the circuit at the upper right hand portion of the drawing including cut-off switch 25 and its associated counter 34c.

A source of high frequency clock pulses is provided by a suitable clock pulse source 38 shown at the upper left hand portion of the drawing. The clock 38 is a 1 MHZ clock, the output of which provides the counter stages 34a, 34b and 34c with an accurate 1 MHZ clock pulse source. It will be understood that the decimal counters 34a–34c may be optionally of the count-down or count-up type. In the present embodiment, these counters are all of the count-down type.

Also included in the digital multivibrator is a control D flip-flop 30 which is connected in circuit as shown. A dual input "nand" gate 40 is shown with its two inputs connected respectively to the Q output of the flip-flop 30 and a cut-off line 42. The output of gate 40 is connected to the $\overline{MR}$, $\overline{PE}$ terminals of the counter 34c associated with short circuit cut-off switch 25. An "and" gate 41 is shown with its two inputs connected respectively to a "module on" terminal and to the D and Q terminals of the flip-flop 30. The output from the "and" gate 41 is connected to the drive stage 10 as shown in the lower portion of the drawing to pass triggering pulses thereto. It will further be seen that the short circuit or cut-off signal passed through the line 42 receives its signal input from a gap voltage sensing circuit 50 which in turn is coupled to one of the gap elements such as the tool electrode 18.

The present invention will be considered from several viewpoints. The first feature of particular attention is the free running multivibrator including switch 22 controlling ON time, switch 24 controlling OFF time with the associated data selector stages 26a and 26b, the associated counter stages 34a and 34b and the manner in which these operatively function with the flip-flop 30 in a free running manner to provide digitally predetermined machine ON-OFF time power pulses to the output transistor 12. The free running multivibrator portion of the system is a novel and highly accurate multivibrator with precise control over ON-OFF time. Perhaps even more importantly, the free running multivibrator operates without need for any external trigger or sync to initiate or control its operation. In relatively low current magnitude machining, for example, in an EDM wire cutting operation where there is small likelihood of gap short circuit occurring, the operation of the multivibrator in its free running mode without the incorporation of the short circuit portion may be satisfactory.

The other main feature to which the present invention is directed is the combination of the free running multivibrator just described and the short circuit protection system associated with it. The protection system includes the additional binary coded decimal thumbwheel cut-off switch 25 and its associated counter 34c. This second feature as well as the first will be explained and clarified in the following section entitled "Description of Operation". It will be understood that the free running multivibrator may be operated independently of any short circuit cut-off system. The short circuit cut-off system may selectively be enabled or disabled, for example, through the inclusion of a manual switch 43 in the cut-off signal line 45 as shown. In the open position of the switch 43, the short circuit cut-off system is effectively removed from the EDM power supply.

DESCRIPTION OF OPERATION

In the operation of the free running digital multivibrator the ON time is set on switch 22 and the OFF time is set on switch 24. It will be understood the lines shown communicating, for example, between the switch 22 and the A input terminal of the data selector stages 26a and 26b comprise four separate lines to handle the binary coded decimal bits. In a like manner the output line shown in simplified fashion from the switch 24 comprises four separate lines between it and the input terminal B of the data selector stages 26a and 26b. With respect to the counters 34a and 34b, their respective terminals labeled $P_0$, $P_1$, $P_2$ and $P_3$ supply a number (from 0–9) to which the ON and OFF time counters 34a and 34b are internally reset when they have counted down to zero. When a counter has counted down to zero, the Buss output is released to go high. Since the counters 34a and 34b are cascaded and the Buss outputs are tied together, both counters must be at zero in order for the Buss to go high. It will further be seen that the terminals MR and PE are disabled on the counters 34a and 34b. Terminals MR and PE are used to enable or disable cut-off counter 34c depending on the condition of the cut-off line 42. If both input lines to the counter 34c are low, the counter releases the Buss all the time and will not enter into the count. If the input lines are high, counter 34c will have to finish its count to zero before control can be switched back to counter 34a.

In the free running mode of operation of the multivibrator, switch 43 is opened in the output line from the "nand" gate 40. The counters 34a and 34b are preset to the ON time numbers by the switch 22 through data selector stages 26a and 26b. With pin 1 high, the ON time is selected. The counters are preset to ON time at the leading edge of the 1 MHZ clock and down count each cycle to zero. When both counters have reached zero, the Busses will go high thus clocking the flip-flop 30. The Q output of the flip-flop 30 and pin 1 of data selector stages 26a and 26b will go low thus selecting the OFF time number from the switch 24. When the next clock cycle goes high, the counters are preset to the OFF time number and the above cycle repeats itself again till zero is reached. At that time, the Buss output goes high again and clocks the flip-flop 30. The Q output changes pin 1 of the data select stages 26a and 26b and thus selects the ON time number again. With power applied, the flip-flop 30 can come up in either state and will select one number or the other and will operate the multivibrator in a free running mode. No external sync or triggering feedback from the gap is required to run it in this fashion.

If it is necessary to run the multivibrator with its short circuit protection system activated, switch 43 is closed. If there is a problem at the work gap, gap voltage is sensed by the gap voltage sensing circuit 50. Problems at the work gap are typically reflected in a sharp drop in voltage at the work gap. At this point, it is desirable to lengthen the OFF time and in this manner reduce gap current to avoid damage to the electrode 18 and/or the workpiece 20 until the short circuit condition at the gap can be relieved. If the voltage on the cut-off line 42 goes low, the output of the "nand" gate 40 will go high thus allowing the cut-off counter 34c to become operative. When the ON-OFF time counters 34a and 34b are at zero and release the Buss, the counter 34c is in condition to count a count. If the counters 34a and 34b are not at zero condition, the Buss output will be held at zero. If the counter 34c is not at zero, the counters 34a and 34b will continue in this state until this counter 34c counts to zero. This effectively will multiply the OFF time duration by a factor from 1 to 16 as set preliminarily by the cut-off binary coded decimal switch 25.

It will thus be seen that we have provided by our invention a novel and improved free running multivibrator for EDM. We have further provided a multivibrator which is particularly adaptable for operation with an improved short circuit cut-off system according to our invention.

We claim:

1. An electrical discharge machining apparatus including an electronic output switch and a power source operatively connected to a machining gap for providing machining power pulses of digitally predetermined ON-OFF time duration thereto, and a free-running, digital type multivibrator, comprising:
   a plurality of separately settable ON time and OFF time switches;
   a counter stage sequentially connectable to said ON time and OFF time switches;
   a data selector stage coupled intermediate said switches and said counter stage, respectively;
   a high frequency pulse source directly connected to said counter stage for providing a continuous pulse train thereto for operating said counter stage;
   a bistable control means having a pair of different output terminals, the first of said pair operatively connected to said data selector stage for alternately connecting said ON time and said OFF time switches to the counter stage responsive to high and low state of said first output terminal, said counter stage further operable to provide a separate enabling clock pulse to said bistable control means at the end of each count cycle of each ON time and each OFF time; and
   the other of said pair connected to the control electrode of said electronic output switch for controlling its ON-OFF time operation.

2. The combination as set forth in claim 1 wherein said other of said output terminals of the bistable means is connected to the control electrode of the said output switch through an intermediate amplifier and drive stage.

3. The combination as set forth in claim 1 wherein said bistable means comprises a flip-flop and wherein said counter comprises a counter of the count-down type operable to provide said clock pulse to said flip-flop each time the counter reaches a zero level.

4. The combination as set forth in claim 1 wherein said switches controlling ON and OFF times are of the binary coded decimal thumbwheel type.

5. The combination as set forth in claim 1 wherein said bistable control means comprises a flip-flop having its clock input connected to the buss terminals of the counter stage, said counter stage further comprising a pair of counters coupled in cascade, one to the other.

6. An electrical discharge machining apparatus including an electronic output switch and a power source operatively connected to a machining gap for providing machining power pulses of digitally predetermined ON-OFF time duration thereto, and a free-running, digital type multivibrator, comprising:
   a plurality of separately settable ON time and OFF time switches;
   a counter stage sequentially connectable to said ON time and OFF time switches;
   a data selector stage coupled intermediate said switches and said counter stage, respectively;
   a high frequency pulse source connected to said counter stage for providing a continuous pulse train thereto independent of machining gap condition for operating said counter stage;
   a bistable control means having a pair of different output terminals, the first of said pair operatively connected to said data selector stage for alternately connecting said ON time and said OFF time switches to the counter stage responsive to high and low state of said first output terminal, said counter stage further operable to provide a separate enabling clock pulse to said bistable control means at the end of each count cycle of each ON time and each OFF time; and the other of said pair connected to the control electrode of said electronic output switch for controlling its ON-OFF time operation.

7. The combination as set forth in claim 6 wherein said other of said output terminals of the bistable means is connected to the control electrode of the said output switch through an intermediate amplifier and drive stage.

8. The combination as set forth in claim 6 wherein said bistable means comprises a flip-flop and wherein said counter comprises a counter of the count-down type operable to provide said clock pulse to said flip-flop each time the counter reaches a zero level.

9. The combination as set forth in claim 6 wherein said switches controlling ON and OFF times are of the binary coded decimal thumbwheel type.

10. The combination as set forth in claim 6 wherein said bistable control means comprises a flip-flop having its clock input connected to the buss terminals of the counter stage, said counter stage further comprising a pair of counters coupled in cascade, one to the other.

* * * * *